(12) United States Patent
Heuer et al.

(10) Patent No.: US 7,607,080 B2
(45) Date of Patent: Oct. 20, 2009

(54) METHOD FOR CODING STRUCTURED DOCUMENTS

(76) Inventors: Jörg Heuer, Fischbachauerstrasse 8, 81539 München (DE); Andreas Hutter, Sturmiusweg 42, 81673 München (DE)

( * ) Notice: Subject to any disclaimer, the term of this patent is extended or adjusted under 35 U.S.C. 154(b) by 526 days.

(21) Appl. No.: 10/564,601

(22) PCT Filed: Jul. 2, 2004

(86) PCT No.: PCT/EP2004/051333

§ 371 (c)(1),
(2), (4) Date: Jan. 12, 2006

(87) PCT Pub. No.: WO2005/008520

PCT Pub. Date: Jan. 27, 2005

(65) Prior Publication Data

US 2006/0212796 A1    Sep. 21, 2006

(30) Foreign Application Priority Data

Jul. 15, 2003   (DE) ................ 103 32 054
Nov. 6, 2003    (DE) ................ 103 51 897

(51) Int. Cl.
*G06F 17/00*   (2006.01)
(52) U.S. Cl. .................................... 715/234
(58) Field of Classification Search ............ 715/234
See application file for complete search history.

(56) References Cited

U.S. PATENT DOCUMENTS

2003/0121005 A1   6/2003   Herbst et al.
2004/0068696 A1   4/2004   Seyrat et al.
2004/0186841 A1   9/2004   Heuer et al.

FOREIGN PATENT DOCUMENTS

| EP | 1 158 420 A1 | 5/2000 |
| EP | 1 158 420 | 11/2001 |
| WO | WO 02/063775 | 8/2002 |
| WO | WO 02/063775 A2 | 8/2002 |
| WO | WO 03/001811 | 1/2003 |
| WO | WO 03/001811 A1 | 1/2003 |

OTHER PUBLICATIONS

Ammons, et al., "Mining Specifications", POPL '02, published Jan. 2002, ACM, p. 4-16.*
XP001001465—"Text of ISO/IEC FCD 15938-1 Information Technology—Multimedia Content Description Interface—Part 1 Systems" Mar. 2001.

(Continued)

*Primary Examiner*—Amelia Rutledge
(74) *Attorney, Agent, or Firm*—McDonnell Boehnen Hulbert & Berghoff LLP

(57) ABSTRACT

The invention present disclosure relates to a method and device for coding a structured document, particularly such as a XML-based document, wherein a plurality of codes are generated by one or more schemas or namespaces, wherein independent codes are assigned for a schema and/or a namespace separately from other schemas and namespaces, for the elements defined or declared in the schemas or namespaces or in groups of schemas or namespaces.

10 Claims, 4 Drawing Sheets

OTHER PUBLICATIONS

XP001131062—"Text of ISO/IEC 15938-1/PDAM1" Dec. 2002.
http://www.w3.org/TR/2001/REC-xmlschema-0-20010502 W3C: XML Schema Part 0: Primer; May 2, 2001.
http://www.w3.org/TR/2001/REC-xmlschema-1-20010502 W3C: XML Schema Part 1: Structures; May 2, 2001.
http://wwvv.w3.org/TR/2001/REC-xmlschema-2-20010502 W3C: XML Schema Part 2: Datatypes; May 2, 2001.
ISO/IEC 13818-4:1998(E); Information technology—Generic coding of moving pictures and associated audio information—Part 4: Conformance testing, Dec. 1, 1998.
ISO/IEC FDIS 15938-1:2002(E) [ISO/IEC JTC 1;] Information technology—Multimedia content description interface—Part 1: Systems, Geneva 2002.
Text of ISO/IEC 15938-1 Information technology—Multimedia content description interface—Part 1 Systems [ISO/IEC JTC1/SC29/WG11 MPEG01/N4001, Mar. 2001, Singapore] Coding of moving pictures and associated audio.
Text of ISO/IEC 15938-1/PDAM [ISO/IEC JTC 1/SC29/WG11 MPEG/N 5486, Awaji, Japan, Dec. 2002] Coding of moving pictures and audio.
VM Spec Java: Programming Language Concepts; The Class File Format.
Niedermeier et al., "An MPEG-7 Tool for Compression and Streaming of XML Data", IEEE International Conference on Multimedia and Expo (ICME), Aug. 26-29, 2002, Lausanne, Switzerland.

* cited by examiner

FIG 2A

```
?xml version="1.0" encoding="ISO-8859-1"?>
<schema targetNamespace="urn : siemens : SchemaA"
xmlns : a="urn : mySchema : SchemaA"
xmlns : xs="http://www.w3.org/2001/XMLSchema"
    <complexType name="Node1">
        <sequence>
            <element name="name" type="xs : string"/>
            <element name="value" type="xs : integer"/>
        </sequence>
    </complexType>
    <complexType name="myFirstType">
        <complexContent>
            <extension base="a : Node1">
                <sequence>
                    <element name="state" type="xs : string"/>
                </sequence>
            </extension>
        </complexContent>
    </complexType>
    <complexType name="mySecondType">
        <complexContent>
            <extension base="a : myFirstType">
                <sequence>
                    <element name="id" type="xs : ID"/>
                </sequence>
            </extension>
        </complexContent>
    </complexType
</schema>
```
} A `<?xml version="1.0" encoding="ISO-8859-1"?>`

FIG 2B

```
<schema targetNamespace="urn : mySchema : SchemaX"
xmlns : x="urn : mySchema : SchemaX"
xmlns : a="urn : mySchema : SchemaA"
xmlns : xs="http://www.w3.org/2001/XMLSchema"
    <import namespace="urn : mySchema : SchemaA" SchemaLocation="./
    TreeExample_nsA.xsd"/>
        <complexType name="tType>
            <sequence>
                <element name="name" type="xs : string"/>
                <element name="value" type="xs : integer"/>
            </sequence>
        </complexType>
        <complexType name="iType">
            <complexContent>
                <extension base="a:Node1">
                    <sequence>
                        <element name="state" type="xs : string"/>
                    </sequence>
                </extension>
            </complexContent>
        </complexType>
        <complexType name="sType>
            <complexContent>
                <extension base="a:Node1">
                    <sequence>
                        <element name="id" type="xs : ID"/>
                    </sequence>
                </extension>
            </complexContent>
        </complexType>
        <complexType name="nType>
            <complexContent>
                <extension base="x : sType">
                    <sequence>
                        <element name="price" type="xs : float"/>
                    </sequence>
                </extension>
            </complexContent>
        </complexType>
```

} X

METHOD FOR CODING STRUCTURED DOCUMENTS

FIELD OF TECHNOLOGY

The present disclosure relates to a method and a device by means of which a structured document, particularly an XML-based document, is coded and/or decoded with the aid of schemas.

BACKGROUND

XML (eXtensible Markup Language) is a language which enables a structured description of the contents of a document by means of XML-schema language definitions. A more precise description of the XML schema and of the structures, data types and content models used therein is found in references [1], [2] and [3], and are incorporated by reference in their entirety therein.

An XML Schema consists of components such as type definitions and element declarations. These can be used to assess the validity of well-formed element and attribute information items and furthermore may specify augmentations to those items and their descendants.

Schema-validity assessment has two aspects: (1) determining local schema-validity, that is whether an element or attribute information item satisfies the constraints embodied in the relevant components of an XML Schema and (2) synthesizing an overall validation outcome for the item, combining local schema-validity with the results of schema-validity assessments of its descendants, if any, and adding appropriate augmentations to an XML infoset to record this outcome. Reference [2] uses the word "valid" and its derivatives are used to refer to (1) above, the determination of local schema-validity and uses the word "assessment" is used to refer to the overall process of local validation, schema-validity assessment and infoset augmentation.

Three levels of conformance have been described for schema aware processors. The first is required of all processors. Support for the other two will depend on the application environments for which the processor is intended. The first level of "minimally conforming" processors must completely and correctly implement: Schema Component Constraints, which are constraints that describes each component of a schema, Validation Rules, which are rules that determine the validity of each component of a schema, and Schema Information Set Contribution, which are additional rules on each component of the schema that are a consequence of the validation and/or assessment of a given schema component. The second level, which are processors that provide "conformance to the XML Representation of Schemas", are processors that accept schemas represented in the form of XML documents as described in [2].

By separating the conformance requirements relating to the concrete syntax of XML schema documents, processors which use schemas stored in optimized binary representations, dynamically created schemas represented as programming language data structures, or implementations in which particular schemas are compiled into executable code such as C or Java are admitted as conforming. Such processors may be minimally conforming but not necessarily in conformance to the XML Representation of Schemas.

The third level of "fully conforming" processors are network-enabled processors which are not only both minimally conforming and in conformance to the XML Representation of Schemas, but which additionally must be capable of accessing schema documents from the World Wide Web as described in document [2].

Document [3] further describes two of the three levels of conformance with respect to data types. Minimally conforming processors must completely and correctly implement the Constraint on Schemas, which are constraints that describes each component of a schema, and the Validation Rule, which provides constraints expressed by schema components which information items must satisfy to be schema-valid. Processors that provide conformance to the XML Representation of Schemas must completely and correctly implement all Schema Representation Constraints, which are constraints on the representation of schema components in XML as described in [3], and must adhere exactly to the specifications in XML Representation of Simple Type Definition Schema Components, which describes the rules for a Simple Type element information item.

A 3-layer architecture may be detailed as implied by the three conformance levels. The layers are: (1) the "assessment core", relating schema components and instance information items, (2) schema representation, relating the connections between XML representations and schema components, including the relationships between namespaces and schema components, and (3) XML Schema web-interoperability guidelines, relating instance-to-schema and schema-to-schema connections for the World Wide Web.

Layer 1 specifies the manner in which a schema composed of schema components can be applied to in the assessment of an instance element information item. Layer 2 specifies the use of schema elements in XML documents as the standard XML representation for schema information in a broad range of computer systems and execution environments. To support interoperation over the World Wide Web in particular, layer 3 provides a set of conventions for schema reference on the Web.

Reference [3] defines "datatypes" to be used in XML Schemas. A datatype is a 3-tuple, consisting of a) a set of distinct values, called its value space, b) a set of lexical representations, called its lexical space, and c) a set of facets that characterize properties of the value space, individual values or lexical items. A value space is the set of values for a given datatype. Each value in the value space of a datatype is denoted by one or more literals in its lexical space. A lexical space is the set of valid literals for a datatype. For example, "100" and "1.0E2" are two different literals from the lexical space of the "float" datatype which both denote the same value. A facet is a single defining aspect of a value space. Generally speaking, each facet characterizes a value space along independent axes or dimensions.

Datatypes may be distinguished as "atomic" datatypes, which are datatypes having values regarded as being indivisible, "list" datatypes, which are datatypes having values each of which consists of a finite-length (possibly empty) sequence of values of an atomic datatype, and "union" datatypes, which are datatypes whose value spaces and lexical spaces are the union of the value spaces and lexical spaces of one or more other datatypes. Datatypes may also be distinguished as "primitive" or "derived". Primitive datatypes are those that are not defined in terms of other datatypes and derived datatypes are those that are defined in terms of other datatypes. For example, with respect to Reference [3], a "float" datatype is a well-defined mathematical concept that cannot be defined in terms of other datatypes, while an "integer" datatype is a special case of the more general datatype "decimal".

Methods, devices or systems for coding and/or decoding XML-based documents are known from publications relating to the MPEG-7 standard, in particular from document [4].

Known methods for the binary representation of MPEG-7 and other XML-based descriptions or documents have shortcomings in terms of compatibility, insofar as the schemas of the XML-based descriptions or documents to be coded are not fully known to the encoder and/or decoder at the start of transmission. In document [4], for example, a method for the binary representation of XML descriptions and XML documents is described which specifies code tables for XML descriptions and XML documents based on schemas and namespaces. Here, a namespace is a space in the document structure in which the names used therein are assigned unique meanings or declarations, it being possible for the names occurring in one namespace to appear in other namespaces with different meanings or declarations. By contrast, at least one part of the namespace is defined by means of a schema. In the method described in [4], the code tables for the data types, the global elements and the SubstitutionGroups are dependent on all the namespaces used. The schemas and namespaces must accordingly be known before the code tables are generated.

SUMMARY

Accordingly, an efficient coding method and related system is disclosed, even where the schemas are not fully known to the encoder and/or decoder.

Under an exemplary embodiment, a structured document is coded, wherein a plurality of codes are generated by means of one or more schemas and/or namespaces. Independent codes are assigned for a schema and/or a namespace for a group of schemas and namespaces separately from other schemas and namespaces for the elements defined or declared in the schemas and namespaces in the groups of schemas and namespaces.

Under the embodiment, codes are assigned separately in schemas and/or namespaces. This is advantageous since schemas and/or namespaces can then be loaded as required even during the transmission of documents, and existing code tables for other namespaces are not modified as a result and consequently do not have to be regenerated. A further advantage is that for cases in which very many namespaces are imported the separate codes need fewer bits for addressing than when, as in [4], all the namespaces are combined. Even in cases in which a very large namespace is imported, the separate codes for the other namespaces can be coded by means of fewer bits.

The separate codes of the structured document are subdivided into address areas, the schema and/or the namespace, or the group of schemas and/or namespaces, being identifiable by means of the address areas.

The inventive coding method, the separate codes respectively comprise a local code with regard to the schema and/or the namespace with regard to the group of schemas and/or namespaces and an identification code which identifies the schema and/or the name space and/or the group of schemas and/or namespaces. Here, a local code is a code which is unique within the schema and/or namespace identified by the identification code.

Preferably, separate codes are assigned for global elements and/or SubstitutionGroups and/or data types. A precise definition for global elements, SubstitutionGroups and data types can be found in the XML-schema definitions, which are explained in detail in documents [1], [2] and [3].

In particular, the element declaration schema component has the following properties:

Schema Component: Element Declaration

{name}
An NCName as defined by [XML-Namespaces].

{target namespace}
Either •absent• or a namespace name, as defined in [XML-Namespaces].

{type definition}
Either a simple type definition or a complex type definition.

{scope}
Optional. Either global or a complex type definition.

{value constraint}
Optional. A pair consisting of a value and one of default, fixed.

{nillable}
A boolean.

{identity-constraint definitions}
A set of constraint definitions.

{substitution group affiliation}
Optional. A top-level element definition.

{substitution group exclusions}
A subset of {extension, restriction}.

{disallowed substitutions}
A subset of {substitution, extension, restriction}.

{abstract}
A boolean.

{annotation}
Optional. An annotation.

The {name} property must match the local part of the names of element information items being •validated•.

A {scope} of global identifies element declarations available for use in content models throughout the schema. Locally scoped declarations are available for use only within the complex type identified by the {scope} property. This property is •absent• in the case of declarations within named model groups: their scope is determined when they are used in the construction of complex type definitions.

A non-•absent• value of the {target namespace} property provides for •validation• of namespace-qualified element information items. •Absent• values of {target namespace} •validate• unqualified items.

An element information item is •valid• if it satisfies the {type definition}. For such an item, schema information set contributions appropriate to the {type definition} are added to the corresponding element information item in the post-schema-validation infoset.

If {nillable} is true, then an element may also be •valid• if it carries the namespace qualified attribute with [local name] nil from namespace www.w3.org/2001/XMLSchema-instance and value true even if it has no text or element content despite a {content type} which would otherwise require content.

{value constraint} establishes a default or fixed value for an element. If default is specified, and if the element being •validated• is empty, then the canonical form of the supplied constraint value becomes the [schema normalized value] of the •validated• element in the post-schema-validation infoset. If fixed is specified, then the element's content must either be empty, in which case fixed behaves as default, or its value must match the supplied constraint value.

NOTE: The provision of defaults for elements goes beyond what is possible in XML 1.0 DTDs, and does not exactly correspond to defaults for attributes. In particular, an element with a non-empty {value constraint} whose simple type definition includes the empty string in its lexical space will nonetheless never receive that value, because the {value constraint} will override it.

{identity-constraint definitions} express constraints establishing uniquenesses and reference relationships among the values of related elements and attributes.

Element declarations are members of the substitution group, if any, identified by {substitution group affiliation}. Membership is transitive but not symmetric; an element declaration is a member of any group of which its {substitution group affiliation} is a member.

An empty {substitution group exclusions} allows a declaration to be nominated as the {substitution group affiliation} of other element declarations having the same {type definition} or types derived therefrom. The explicit values of {substitution group exclusions} rule out element declarations having types which are extensions or restrictions respectively of {type definition}. If both values are specified, then the declaration may not be nominated as the {substitution group affiliation} of any other declaration.

The supplied values for {disallowed substitutions} determine whether an element declaration appearing in a •content model• will be prevented from additionally •validating• elements (a) with an xsi:type that identifies an extension or restriction of the type of the declared element, and/or (b) from •validating• elements which are in the substitution group headed by the declared element. If {disallowed substitutions} is empty, then all derived types and substitution group members are allowed.

Element declarations for which {abstract} is true can appear in content models only when substitution is allowed; such declarations may not themselves ever be used to validate element content.

The XML representation for an element declaration schema component is an <element> element information item. It specifies a type definition for an element either by reference or explicitly, and may provide occurrence and default information. The correspondences between the properties of the information item and properties of the component(s) it corresponds to are as follows:

XML Representation Summary: element Element Information Item

```
<element
    abstract=boolean:false
    block=(#all|List of (extension|restriction|substitution))
    default=string
    final=(#all|List of (extension|restriction))
    fixed=string
    form=(qualified|unqualified)
    id=ID
    maxOccurs=(nonNegativeInteger|unbounded):1
    minOccurs=nonNegativeInteger:1
    name=NCName
    nillable=boolean:false
    ref=QName
    substitutionGroup=QName
    type=QName
    {any attributes with non-schema namespace . . .}<
    Content: (annotation!, ((simpleType|complexType)!, (unique|key|keyref)*))
</element>
```

If the <element> element information item has <schema> as its parent, the corresponding schema component is as follows:

Element Declaration Schema Component

Property Representation

{name} The •actual value• of the name [attribute].

{target namespace} The •actual value• of the targetNamespace [attribute] of the parent <schema> element information item, or •absent• if there is none.

{scope} global.

{type definition} The type definition corresponding to the <simpleType> or <complexType> element information item in the [children], if either is present, otherwise the type definition •resolved• to by the •actual value• of the type [attribute], otherwise the {type definition} of the element declaration •resolved• to by the •actual value• of the substitutionGroup [attribute], if present, otherwise the •ur-type definition•.

{nillable} The •actual value• of the nillable [attribute], if present, otherwise false.

{value constraint} If there is a default or a fixed [attribute], then a pair consisting of the •actual value• (with respect to the {type definition}, if it is a simple type definition, or the {type definition}'s {content type}, if that is a simple type definition, or else with respect to the built-in string simple type definition) of that [attribute] and either default or fixed, as appropriate, otherwise •absent•.

{identity-constraint definitions} A set consisting of the identity-constraint-definitions corresponding to all the <key>, <unique> and <keyref> element information items in the [children], if any, otherwise the empty set.

{substitution group affiliation} The element declaration •resolved• to by the •actual value• of the substitutionGroup [attribute], if present, otherwise •absent•.

{disallowed substitutions} A set depending on the •actual value• of the block [attribute], if present, otherwise on the •actual value• of the blockDefault [attribute] of the ancestor <schema> element information item, if present, otherwise on the empty string. Call this the EBV (for effective block value). Then the value of this property is the appropriate case among the following:

1 If the EBV is the empty string, then the empty set;

2 If the EBV is #all, then {extension, restriction, substitution};

3 otherwise a set with members drawn from the set above, each being present or absent depending on whether the •actual value• (which is a list) contains an equivalently named item.

NOTE: Although the blockDefault [attribute] of <schema> may include values other than extension, restriction or substitution, those values are ignored in the determination of {disallowed substitutions} for element declarations (they are used elsewhere).

{substitution group exclusions} As for {disallowed substitutions} above, but using the final and finalDefault [attributes] in place of the block and blockDefault [attributes] and with the relevant set being {extension, restriction}.

{abstract} The •actual value• of the abstract [attribute], if present, otherwise false.

{annotation} The annotation corresponding to the <annotation> element information item in the [children], if present, otherwise •absent•.

otherwise if the <element> element information item has <complexType> or <group> as an ancestor and the ref [attribute] is absent, the corresponding schema components are as follows (unless minOccurs=maxOccurs=0, in which case the item corresponds to no component at all):

Particle Schema Component

Property Representation
{min occurs} The •actual value• of the minOccurs [attribute], if present, otherwise 1.
{max occurs} unbounded, if the maxOccurs [attribute] equals unbounded, otherwise the actual value of the maxOccurs [attribute], if present, otherwise 1.
{term} A (local) element declaration as given below.

An element declaration as in the first case above, with the exception of its {target namespace} and {scope} properties, which are as below:

Element Declaration Schema Component

Property Representation
{target namespace} If form is present and its •actual value• is qualified, or if form is absent and the •actual value• of elementFormDefault on the <schema> ancestor is qualified, then the •actual value• of the targetNamespace [attribute] of the parent <schema> element information item, or absent if there is none, otherwise •absent•.
{scope} If the <element> element information item has <complexType> as an ancestor, the complex definition corresponding to that item, otherwise (the <element> element information item is within a named <group> definition), •absent•.

otherwise (the <element> element information item has <complexType> or <group> as an ancestor and the ref [attribute] is present), the corresponding schema component is as follows (unless minOccurs=maxOccurs=0, in which case the item corresponds to no component at all):

Particle Schema Component

Property Representation
{min occurs} The actual value of the minOccurs [attribute], if present, otherwise 1.
{max occurs} unbounded, if the maxOccurs [attribute] equals unbounded, otherwise the •actual value• of the maxOccurs [attribute], if present, otherwise 1.
{term} The (top-level) element declaration •resolved• to by the •actual value• of the ref [attribute].

<element> corresponds to an element declaration, and allows the type definition of that declaration to be specified either by reference or by explicit inclusion.

<element>s within <schema> produce global element declarations; <element>s within <group> or <complexType> produce either particles which contain global element declarations (if there's a ref attribute) or local declarations (otherwise). For complete declarations, top-level or local, the type attribute is used when the declaration can use a built-in or pre-declared type definition. Otherwise an anonymous <simpleType> or <complexType> is provided inline.

Element information items •validated• by a top-level declaration must be qualified with the {target namespace} of that declaration (if this is •absent•, the item must be unqualified). Control over whether element information items •validated• by a local declaration must be similarly qualified or not is provided by the form [attribute], whose default is provided by the elementFormDefault [attribute] on the enclosing <schema>, via its determination of {target namespace}.

As noted above the names for top-level element declarations are in a separate •symbol space• from the symbol spaces for the names of type definitions, so there can (but need not be) a simple or complex type definition with the same name as a top-level element. As with attribute names, the names of locally-scoped element declarations with no {target namespace} reside in symbol spaces local to the type definition which contains them.

Note that the above allows for two levels of defaulting for unspecified type definitions. An <element> with no referenced or included type definition will correspond to an element declaration which has the same type definition as the head of its substitution group if it identifies one, otherwise the •ur-type definition•. This has the important consequence that the minimum valid element declaration, that is, one with only a name attribute and no contents, is also the most general, validating any combination of text and element content and allowing any attributes.

Example

```
<xs:element name="unconstrained"/>
<xs:element name="emptyElt">
    <xs:complexType>
    <xs:attribute . . . < . . . </xs:attribute>
    </xs:complexType>
</xs:element>

<xs:element name="contextOne">
    <xs:complexType>
        <xs:sequence>
            <xs:element              name="myLocalElement"
                type="myFirstType"/>
            <xs:element ref="globalElement"/>
        </xs:sequence>
    </xs:complexType>
</xs:element>

<xs:element name="contextTwo">
    <xs:complexType>
        <xs:sequence>
            <xs:element              name="myLocalElement"
                type="mySecondType"/>
            <xs:element ref="globalElement"/>
        </xs:sequence>
    </xs:complexType>
</xs:element>
```

The first example above declares an element whose type, by default, is the •ur-type definition•.

The second uses an embedded anonymous complex type definition.

The last two examples illustrate the use of local element declarations. Instances of myLocalElement within contextOne will be constrained by myFirstType, while those within contextTwo will be constrained by mySecondType.

The possibility that differing attribute declarations and/or content models would apply to elements with the same name in different contexts is an extension beyond the expressive power of a DID in XML 1.0.

Example

```
<xs:complexType name="facet">
    <xs:complexContent>
```

```
<xs:extension base="xs:annotated">
    <xs:attribute name="value" use="required"/>
</xs:extension>
</xs:complexContent>
</xs:complexType>

<xs:element name="facet" type="xs:facet" abstract="true"/>

<xs:element name="encoding" substitutionGroup="xs:facet">
    <xs:complexType>
        <xs:complexContent>
            <xs:restriction base="xs:facet">
                <xs:sequence>
                    <xs:element ref="annotation" minOccurs="0"/>
                </xs:sequence>
                <xs:attribute name="value" type="xs:encodings"/>
            </xs:restriction>
        </xs:complexContent>
    </xs:complexType>
</xs:element>

<xs:element name="period" substitutionGroup="xs:facet">
    <xs:complexType>
        <xs:complexContent>
            <xs:restriction base="xs:facet">
                <xs:sequence>
                    <xs:element ref="annotation" minOccurs="0"/>
                </xs:sequence>
                <xs:attribute name="value" type="xs:duration"/>
            </xs:restriction>
        </xs:complexContent>
    </xs:complexType>
</xs:element>

<xs:complexType name="datatype">
    <xs:sequence>
        <xs:element ref="facet" minOccurs="0" maxOccurs="unbounded"/>
    </xs:sequence>
    <xs:attribute name="name" type="xs:NCName" use="optional"/>
    ...
</xs:complexType>
```

An example from a previous version of the schema for datatypes. The facet type is defined and the facet element is declared to use it. The facet element is abstract—it's only defined to stand as the head for a substitution group. Two further elements are declared, each a member of the facet substitution group. Finally a type is defined which refers to facet, thereby allowing either period or encoding (or any other member of the group).

For TypeCodes data types, which are explained in document [4], separate codes are generated in a preferred embodiment such that within the inheritance tree of a namespace which in relation to a data type adjacent to a first data type in the same namespace has a code distance in relation to the first data type which corresponds to the number of data types in this namespace derived from the first data type. A data type is adjacent to a first data type if the data type has been derived from the same basic data type as a first data type and if, among all the data types which have been derived from this basic data type, the smallest TypeCode that is greater than the TypeCode of the first data type has been assigned to the data type. In this embodiment, the codes for the TypeCodes data types within the—possibly disjoint—inheritance tree are assigned such that an advantageous adjacent relationship in a given namespace is produced and maintained even if subtrees comprising types derived from other namespaces occur in this namespace.

The separate codes within a given namespace are preferably assigned according to a method which comprises the following steps:

in a first step, all the data types of a namespace which have been inherited from data types of other namespaces are sorted in a list in the order defined in the MPEG-7, or similar standard of global TypeCodes of the respective basic data types, the basic data types being the data types in other namespaces from which the sorted data types have been inherited;

in a second step, those data types of a namespace which have been inherited from a specified basic data type of a specified other namespace are in each case sorted lexicographically;

in a third step, all the data types of a namespace which have not been inherited from a data type of another namespace are sorted into the existing list of data types in accordance with the order defined in the MPEG-7, or similar standard;

in a fourth step, the separate codes are assigned in the order of the list to the data types of the namespace.

The advantage of this embodiment is that the addressed data type, particularly a TypeCode, can be found and thus decoded quickly. According to the rules in [4], a TypeCode addresses a derived type relative to a basic type. The basic type thus defines a subtree in which all the addressable data types are found. If the subtree now contains several namespaces, then by virtue of the advantageous adjacent relationship which is achieved in the above embodiment, an addressed data type in the namespace can be found quickly, since, by comparing a sought data type with two adjacent data types in the sorted inheritance tree, it can be determined whether the sought data type is located in the subtree of the data type of the two adjacent data types with the smaller binary code. In this way, the time spent searching can be reduced substantially. A further advantage of this adjacent relationship is that, where the TypeCodes are coded in accordance with [4], a decoder can calculate the length of the code word, which is determined by the number of derived data types, directly from the code distance of adjacent data types.

In addition to the coding method described above, a decoding method is also disclosed by means of which a structured document, such as a XML-based document, is decoded such that a document coded by method described above is decoded. In a preferred embodiment, the code length of the separate code for the binary TypeCode is determined from the number of derived data in order to decode a binary TypeCode. Also, in a preferred embodiment for decoding a specified TypeCode of the subtree of the inheritance tree, the namespace in which the specified TypeCode is located is determined by means of the code distances between adjacent data types.

In addition to the methods described above, the disclosure also relates to a combined coding/decoding device for implementing the steps described above. The disclosure also includes a coding and a decoding device by means of which the coding and decoding method can be implemented.

BRIEF DESCRIPTION OF THE DRAWINGS

The various objects, advantages and novel features of the present disclosure will be more readily apprehended from the following Detailed Description when read in conjunction with the enclosed drawings, in which:

FIGS. 2A and 2B illustrate a diagram of an exemplary XML-schema definition in which data types are also imported and derived from other namespaces.

DETAILED DESCRIPTION

Figure 1:
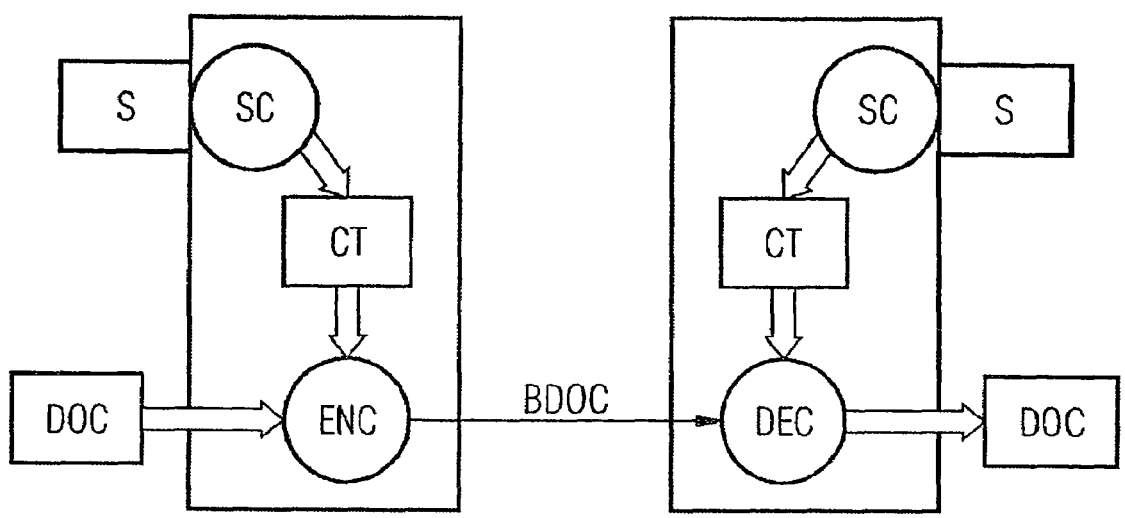
FIG. 1 is illustrates a schematic diagram of a coding and decoding system comprising encoder and decoder.

FIG. 1 shows by way of example a coding and decoding system comprising an encoder ENC and a decoder DEC by means of which XML documents DOC are coded and/or decoded. Both the encoder and the decoder have an XML schema S in which the XML document elements and types used for communication are declared and defined. Code tables CT are generated from the schema S via corresponding schema compilations SC in the encoder and decoder. When the XML document DOC is coded, binary codes are assigned to the contents of the XML document via the code tables. In this way, a binary representation BDOC of the document DOC is generated which can be decoded again with the aid of the code table CT in the decoder. A plurality of schemas can be used here, in particular, schemas can also be used which are based on a basic schema and derived from a further schema.

FIGS. 2A and 2B show by way of example an extract from an XML-schema definition. Such XML-schema definitions are known to one skilled in the art, so the precise content of the extract in FIGS. 2A and 2B is not discussed in detail. The extract contains two schema definitions: firstly, a schema A is defined in the upper section as shown in FIG. 2A, as indicated by a curved bracket, and secondly a schema X is defined in the lower section as shown in FIG. 2B and as also indicated by a curved bracket. The schema X uses in turn data types which have been imported from the schema A.

Figure 3:
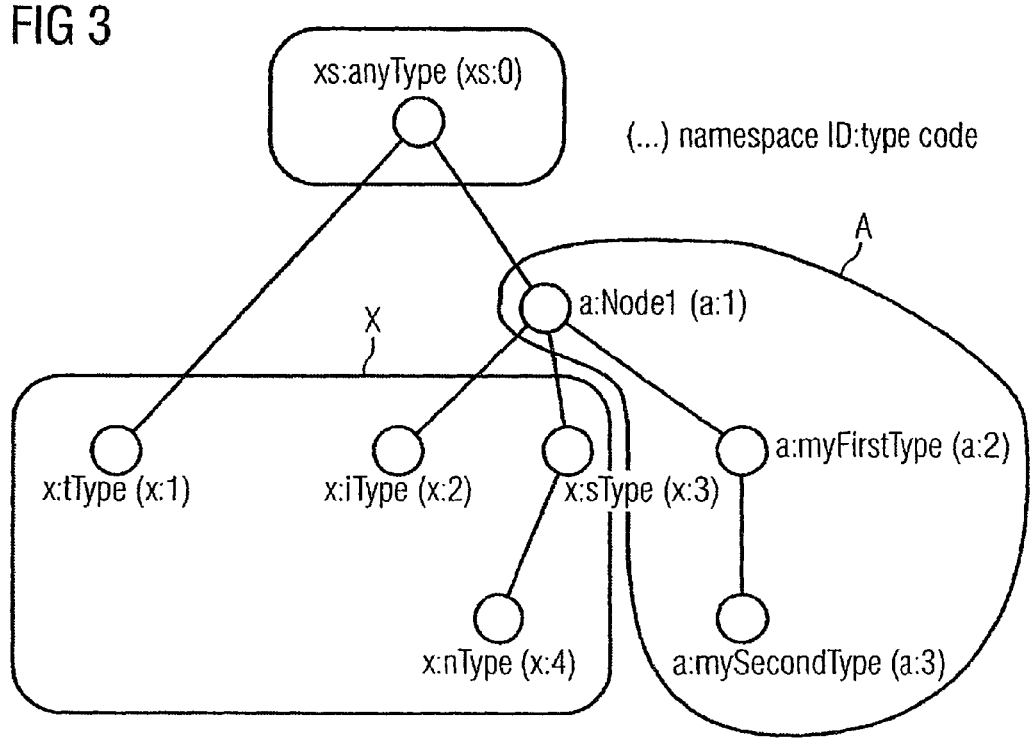
FIG. 3 is a diagram of the inheritance tree of the data types for the XML schema shown in FIG. 2, including the assignment of separate codes to TypeCodes occurring in the namespaces.

FIG. 3 represents graphically the inheritance relationships between the schemas A and X and their data types in the form of a tree structure. As can be seen from the Figure, both schemas A and X are inherited from a schema XS that represents the XML-schema namespace. Each node in the data type tree represents a defined data type in the schema definition. In the schema X, the data types tType, iType, sType and nType are defined. In the schema A, by contrast, the data types Node1, myFirstType and mySecondType are defined. Under the embodiment of FIG. 3, separate codes are assigned for the schema A and X respectively, where codes are specified by the expressions set out in brackets. The expressions specified in brackets here contain the namespace identification "namespace ID" and (separated by a colon) a TypeCode in the form of a local code. For the namespace specification, an x is used for the schema X and an a is used for the schema A. The TypeCode specification is characterized by corresponding digits 1 to 4 in the namespace X and 1 to 3 in the namespace A. The TypeCode specifications are arranged as local codes which are unique within each namespace. By assigning local codes in this way, the schemas A and X are now independent of one another, so that for decoding by means of the one schema it is no longer necessary to transmit the entire other schema to the decoder.

It should be understood that the various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

BIBLIOGRAPHY

[1] http://www.w3.org/TR/2001/REC-xmlschema-0-20010502/
[2] http://www.w3.org/TR/2001/REC-xmlschema-1-20010502/
[3] http://www.w3.org/TR/2001/REC-xmlschema-2-20010502/
[4] ISO/IEC 15938-1 "Multimedia Content Description Interface—Part 1: Systems", Geneva 2002.

The invention claimed is:

1. A method for coding a structured document, comprising:
generating a plurality of codes with an encoder processor using a plurality of namespaces comprising data types;
defining elements in one or more namespaces, and representing the elements in a schema data structure;
assigning independent codes for at least one namespace having defined elements, wherein the independent codes are generated from other namespaces, and wherein the independent codes within a given namespace are assigned by the encoder processor for data types by:
sorting data types of a namespace, which have been inherited from data types of other namespaces, in a list according to an ordering of basic data types, wherein the basic data types comprise data types from inherited namespaces,
sorting lexicographically data types inherited from a specified basic data type of a specified namespace of the plurality of namespaces,
sorting the data types of a namespace which have not been inherited from a data type of another namespace into the ordering of basic data types, and
assigning the independent codes in the order of the ordering of the basic data types of the namespace; and
at the encoder processor, outputting a binary representation of the structured document based on the plurality of codes and the independent codes.

2. The method according to claim 1, wherein the independent codes are subdivided into corresponding address areas.

3. The method according to claim 1, wherein the independent codes each comprise a local code with regard to the namespace and an identification code for identifying the namespace.

4. The method according to claim 1, wherein independent codes are generated for data types within an inheritance tree of a particular namespace which, in relation to a data type adjacent to a first data type in the particular namespace, has a code distance to the first data type, whose code distance corresponds to the number of data types in the particular namespace derived from the first data type.

5. The method according to claim 1, wherein at least one of the plurality of namespaces comprise a group of namespaces.

6. A coding device, comprising:
means for generating a plurality of codes using a plurality of namespaces comprising data types;
means for defining elements in one or more namespaces;
means for assigning independent codes for at least one namespace having defined elements, wherein the independent codes are generated from other namespaces, and wherein the means for assigning independent codes within a given namespace for data types comprises:

means for sorting data types of a namespace, which have been inherited from data types of other namespaces, in a list according to an ordering of basic data types, wherein the basic data types comprise data types in other namespaces from which the sorted data types have been inherited, means for sorting lexicographically data types inherited from a specified basic data type of a specified namespace of the plurality of namespaces, means for sorting the data types of a namespace which have not been inherited from a data type of another namespace into the ordering of basic data types, and means for assigning the independent codes in the order of ordering of the basic data types of the namespace; and means for outputting a binary representation of the structured document based on the plurality of codes and the independent codes.

7. A method for decoding a binary representation of a structured document, comprising:

receiving the binary representation of the structured document at a decoder processor;

generating a plurality of codes using a plurality of namespaces comprising data types from one or more eXtensible Markup Language (XML) schema at the decoder processor;

defining elements in one or more namespaces;

assigning independent codes for at least one namespace having defined elements, wherein the independent codes are generated at the decoder processor from other namespaces, wherein the independent codes within a given namespace are assigned for data types by:

sorting data types of a namespace, which have been inherited from data types of other namespaces, in a list according to an ordering of basic data types, wherein the basic data types comprise data types from inherited namespaces, sorting lexicographically data types inherited from a specified basic data type of a specified namespace of the plurality of namespaces, sorting the data types of a namespace which have not been inherited from a data type of another namespace into the ordering of basic data types, and assigning the independent codes in the order of the ordering of the basic data types of the namespace; and at the decoder processor, decoding the binary representation of the structured document based on the plurality of codes and the independent codes.

8. The method according to claim 7, wherein decoding the binary representation of the structured document comprises decoding both the plurality of codes and the independent codes.

9. The method according to claim 7, wherein decoding the binary representation of the structured document comprises determining a code length of separate codes of a binary type from a number of derived data types.

10. The method according to claim 7, wherein decoding the binary representation of the structured document comprises determining a subtree of an inheritance tree of a namespace in which a specified code is located using code distances between adjacent data types.

* * * * *

UNITED STATES PATENT AND TRADEMARK OFFICE
CERTIFICATE OF CORRECTION

PATENT NO. : 7,607,080 B2 Page 1 of 1
APPLICATION NO. : 10/564601
DATED : October 20, 2009
INVENTOR(S) : Heuer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this

Twelfth Day of October, 2010

David J. Kappos
*Director of the United States Patent and Trademark Office*